(12) United States Patent
Vazirani et al.

(10) Patent No.: US 11,082,284 B1
(45) Date of Patent: Aug. 3, 2021

(54) APPLYING CONFIGURATIONS TO APPLICATIONS IN A MULTI-SERVER ENVIRONMENT

(71) Applicant: salesforce.com, inc., San Francisco, CA (US)

(72) Inventors: Sahil Vinod Vazirani, Fremont, CA (US); Madhuri Ravindra Gore, Fremont, CA (US); Parin Nitin Maru, San Jose, CA (US); Reeta Ashokkumar Singh, Fremont, CA (US); Simone Adelio Paganini, Rome (IT)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/774,444

(22) Filed: Jan. 28, 2020

(51) Int. Cl.
| | |
|---|---|
| *G06F 15/16* | (2006.01) |
| *G06F 9/445* | (2018.01) |
| *H04L 12/24* | (2006.01) |
| *H04L 29/08* | (2006.01) |
| *H04L 12/861* | (2013.01) |

(52) U.S. Cl.
CPC ........ *H04L 41/046* (2013.01); *G06F 9/44505* (2013.01); *H04L 49/90* (2013.01); *H04L 67/10* (2013.01)

(58) Field of Classification Search
CPC ............... H04L 29/08072; H04L 29/06; H04L 29/08135; H04L 29/08648; H04L 29/08981; H04L 41/0806; H04L 41/12; H04L 41/082; H04L 41/046; H04L 67/10; H04L 49/90; G06F 8/65; G06F 9/4416; G06F 9/44505
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |

(Continued)

*Primary Examiner* — Abdullahi E Salad
(74) *Attorney, Agent, or Firm* — Jaffery Watson Mendonsa & Hamilton LLP

(57) ABSTRACT

System and methods are described for applying a configuration to an application binary image in a multi-server computing environment. The steps include receiving, by a configuration manager in a multi-server computing environment, a request from a client to apply a selected application configuration to a selected application binary image stored on a selected server in the multi-server computing environment, and forwarding, by the configuration manager, the request to an agent executing on the selected server. The steps further include getting, by the agent, the selected application configuration from a repository, the repository storing a plurality of application configurations; and applying, by the agent, the selected application configuration to the selected application binary image.

18 Claims, 12 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2012/0185682 A1* | 7/2012 | Klings ............... G06F 9/44536 713/1 |
| 2012/0290702 A1* | 11/2012 | Vincent ............... G06F 9/4451 709/223 |
| 2013/0262923 A1* | 10/2013 | Benson ............... G06F 8/60 714/15 |
| 2016/0253202 A1* | 9/2016 | Dunning ............. G06F 9/455 718/1 |
| 2019/0258798 A1* | 8/2019 | Dabbiere ........... H04L 41/0843 |
| 2020/0034167 A1* | 1/2020 | Parthasarathy ..... G06F 9/45558 |
| 2020/0159524 A1* | 5/2020 | Kruempelmann .. G06F 16/2282 |

* cited by examiner

APPLYING CONFIGURATIONS TO APPLICATIONS IN A MULTI-SERVER ENVIRONMENT

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2020, salesforce.com, inc., All Rights Reserved.

TECHNICAL FIELD

One or more implementations relate to cloud computing environments, and more specifically to dynamically applying configurations to applications in a distributed system of a cloud computing environment.

BACKGROUND

"Cloud computing" services provide shared resources, software, and information to computers and other devices upon request or on demand. Cloud computing typically involves the over-the-Internet provision of dynamically scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

The size of data used in the cloud is growing exponentially and maintaining the customer's data availability and consistency for cloud-based Software-as-a-Service (SaaS) applications is a major challenge. When providing a SaaS-based application in a cloud computing environment, ensuring high availability of customer data and meeting the service level agreements (SLAs) of the customers is a priority.

Currently, some applications have configurations that are deployed along with binary images of the applications to target servers as part of deployments of those applications in a cloud computing environment. These deployments are typically based on a master/slave architecture which requires the configuration code to be co-resident with the master server, thereby not achieving a desired immutability property.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

Figure 1A:
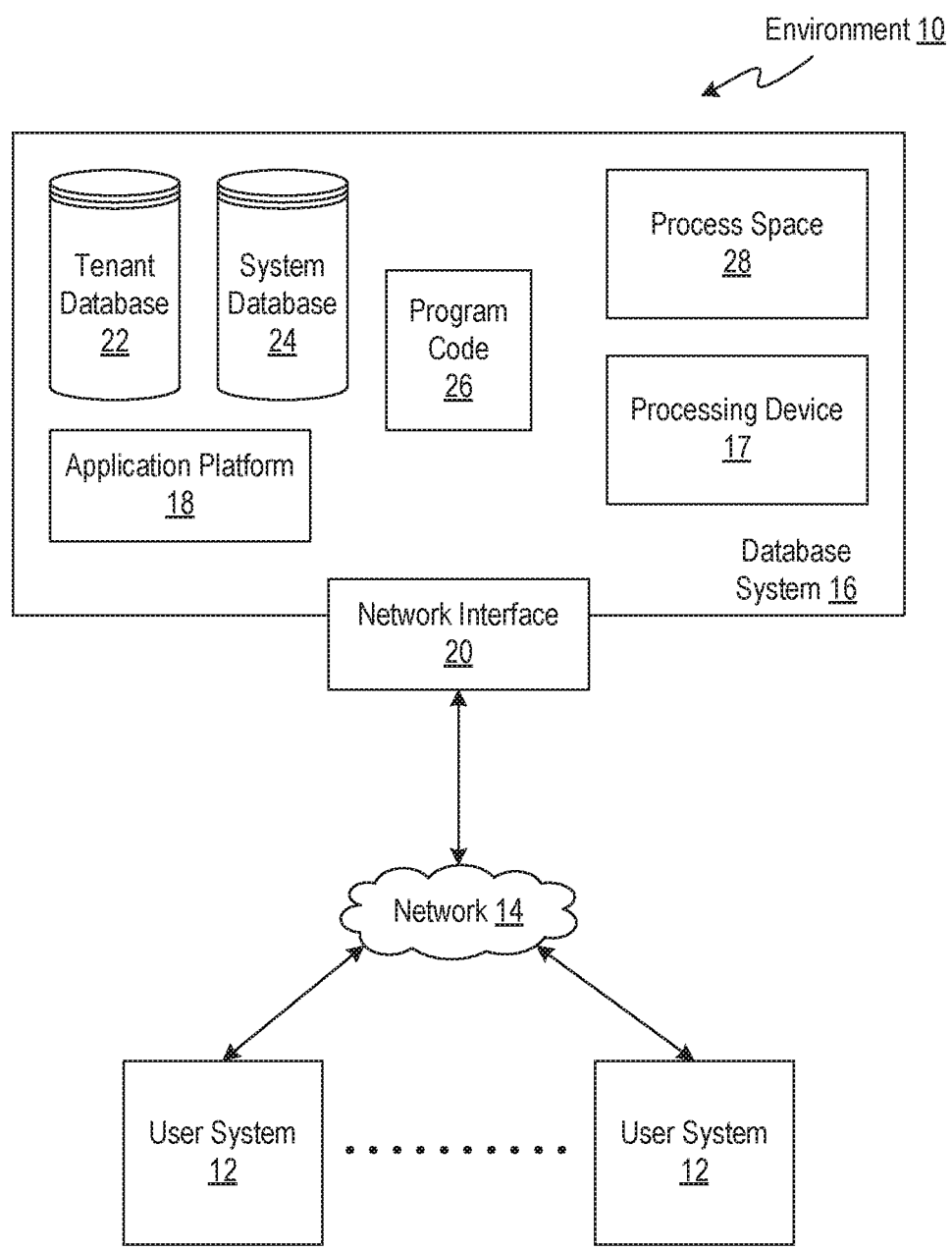
FIG. 1A illustrates an example computing environment of an on-demand database service according to some embodiments.

Embodiments of the present invention comprise a method and apparatus for configuring applications in a multi-server system. Itis desirable in some cloud computing environments to use immutable binary images for one or more applications running on one or more servers. Embodiments of the present invention provide a mechanism to dynamically apply application configuration changes immutably based at least in part on remote events occurring in a multi server computing environment.

Embodiments decouple one or more application configuration templates from an application binary image and create an application configuration template repository. The repository is built and tested via a continuous integration (CI) system and the build package is then extracted via a storage service to one or more files. Agents are deployed on servers to monitor for reception of events specifying tasks causing changes to the configuration of applications. Upon receiving an event (as contained in a message in one embodiment), an agent downloads the required application configuration based at least in part on the event payload and applies the configuration to modify the application binary image. The modified application binary image can then be used (e.g., executed) on the server.

In embodiments, the application configuration changes are stored inside an application configuration file which describes the changes to be applied. An application configuration template is modified based at least in part on user input, resulting in the application configuration file. In an embodiment, application configuration files are maintained in a source control management system (SCM) (such as GIT, for example, a distributed version-control system for tracking changes in source code during software development). The SCM is called a repository herein. Any change in application configuration files in the SCM triggers a continuous deployment pipeline to be executed which deploys the updated application configuration files by a storage service in a storage system (e.g. Amazon Web Services (AWS) Simple Storage Service (S3)). An agent receives an event to apply a specified application configuration file on the server that the agent is running on. The event includes metadata about the change to be executed (e.g., at least the name of the application configuration file to be executed). The agent fetches the latest version of the application configuration file described in the event from the storage service and applies the changes described in the file.

Currently applications have configurations that are typically deployed along with the source/binary image to target servers as part of the deployments. In embodiments of the present invention, only the source/binary images are deployed onto target servers as part of an initial deployment pipeline. The agents co-residing on these servers, respectively, can then download and apply configuration templates as needed based on received events.

Application developers can modify application configuration templates and/or application configurations and check them into the repository and configurations can be made available in production multi-server, multi-datacenter environments in matter of minutes. Based on event triggers, these configurations can be applied by agents on the servers the agents reside on. The approach of embodiments of the present invention is "universal" in nature—the file storage is agnostic of the technology being used in the computing environment, such as specific object stores in a public cloud (such as AWS S3, Google Cloud Platform (GCP) Google Cloud Storage (GCS), Microsoft Azure Blob storage, etc.). The agents can receive events over any kind of "universal" message bus, agnostic of the technology used in a specific implementation (such as Apache Kafka from the Apache Software Foundation Kafka, AWS Simple Queue Service (SQS), GCP Pub/Sub, Microsoft Azure Queue Service, etc.).

FIG. 1A illustrates a block diagram of an example of a cloud computing environment 10 in which an on-demand database service can be used in accordance with some implementations. Environment 10 includes user systems 12 (e.g., customer's computing systems), a network 14, a database system 16 (also referred to herein as a "cloud-based system" or a "cloud computing system"), a processing device 17, an application platform 18, a network interface 20, a tenant database 22 for storing tenant data (such as data sets), a system database 24 for storing system data, program code 26 for implementing various functions of the database system 16 (including a visual data cleaning application), and process space 28 for executing database system processes and tenant-specific processes, such as running applications for customers as part of an application hosting service. In some other implementations, environment 10 may not have all these components or systems, or may have other components or systems instead of, or in addition to, those listed above. In some embodiments, tenant database 22 is a shared storage.

In some implementations, environment 10 is a computing environment in which an on-demand database service (such as a distributed search application) exists. An on-demand database service, such as that which can be implemented using database system 16, is a service that is made available to users outside an enterprise (or enterprises) that owns, maintains, or provides access to database system 16. As described above, such users generally do not need to be concerned with building or maintaining database system 16. Instead, resources provided by database system 16 may be available for such users' use when the users need services provided by database system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a large number of customers, and a given database table may store rows of data for a potentially much larger number of customers. A database image can include one or more database objects. A relational database management system (RDBMS) or the equivalent can execute storage and retrieval of information against the database object(s).

Application platform 18 can be a framework that allows the applications of database system 16 to execute, such as the hardware or software infrastructure of database system 16. In some implementations, application platform 18 enables the creation, management and execution of one or more applications developed by the provider of the on-demand database service, users accessing the on-demand database service via user systems 12, or third-party application developers accessing the on-demand database service via user systems 12.

In some embodiments, application platform 18 includes one or more of repository 404, continuous deployment pipeline 410, configuration manager 422 and/or agents 428, . . . 430, as described herein.

In some implementations, database system 16 implements a web-based customer relationship management (CRM) system. For example, in some such implementations, database system 16 includes application servers configured to implement and execute CRM software applications as well as provide related data, code, forms, renderable web pages, and documents and other information to and from user systems 12 and to store to, and retrieve from, a database system related data, objects, and World Wide Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. Database system 16 also implements applications other than, or in addition to, a CRM application. For example, database system 16 can provide tenant access to multiple hosted (standard and custom) applications, including a CRM application. User (or third-party developer) applications, which may or may not include CRM, may be supported by application platform 18. Application platform 18 manages the creation and storage of the applications into one or more database objects and the execution of the applications in one or more virtual machines in the process space of database system 16.

According to some implementations, each database system 16 is configured to provide web pages, forms, applications, data, and media content to user (client) systems 12 to support the access by user systems 12 as tenants of database system 16. As such, database system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application, such as an object-oriented database management system (OODBMS), a relational database management system (RDBMS), or an unstructured DB such as "noSQL" as is well known in the art. It should also be understood that "server system", "server", "server node", and "node" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

Network 14 can be or include any network or combination of networks of systems or devices that communicate with one another. For example, network 14 can be or include any one or any combination of a local area network (LAN), wide area network (WAN), telephone network, wireless network, cellular network, point-to-point network, star network, token ring network, hub network, or other appropriate configuration. Network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

User systems 12 (e.g., operated by customers) can communicate with database system 16 using TCP/IP and, at a higher network level, other common Internet protocols to communicate, such as the Hyper Text Transfer Protocol (HTTP), Hyper Text Transfer Protocol Secure (HTTPS), File Transfer Protocol (FTP), Apple File Service (AFS), Wireless Application Protocol (WAP), Secure Sockets layer (SSL) etc. In an example where HTTP is used, each user system 12 can include an HTTP client commonly referred to as a "web browser" or simply a "browser" for sending and receiving HTTP signals to and from an HTTP server of the database system 16. Such an HTTP server can be implemented as the sole network interface 20 between database system 16 and network 14, but other techniques can be used in addition to or instead of these techniques. In some implementations, network interface 20 between database system 16 and network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

User systems 12 can be implemented as any computing device(s) or other data processing apparatus or systems usable by users to access database system 16. For example, any of user systems 12 can be a desktop computer, a workstation, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. When discussed in the context of a user, the terms "user system," "user device," and "user computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, Google's Chrome browser, or a WAP-enabled browser in the case of a cellular phone, personal digital assistant (PDA), or other wireless device, allowing a user (for example, a subscriber of on-demand services provided by database system 16) of user system 12 to access, process, and view information, pages, and applications available to it from database system 16 over network 14.

Each user system 12 also typically includes one or more user input devices, such as a keyboard, a mouse, a trackball, a touch pad, a touch screen, a pen or stylus, or the like, for interacting with a graphical user interface (GUI) provided by the browser on a display (for example, a monitor screen, liquid crystal display (LCD), light-emitting diode (LED) display, etc.) of user system 12 in conjunction with pages, forms, applications, and other information provided by database system 16 or other systems or servers. For example, the user interface device can be used to access data and applications hosted database system 16, and to perform searches on stored data, or otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with database system 16, that user system can have the capacities allotted to the salesperson. However, while an administrator is using that user system 12 to interact with database system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU), such as a Core® processor commercially available from Intel Corporation or the like. Similarly, database system 16 (and additional instances of an MTS, where more than one is present) and all of its components can be operator-configurable using application(s) including computer code to run using processing device 17, which may be implemented to include a CPU, which may include an Intel Core® processor or the like, or multiple CPUs. Each CPU may have multiple processing cores.

Database system 16 includes non-transitory computer-readable storage media having instructions stored thereon that are executable by or used to program a server or other computing system (or collection of such servers or computing systems) to perform some of the implementation of processes described herein. For example, program code 26 can include instructions for operating and configuring database system 16 to intercommunicate and to process web pages, applications, and other data and media content as described herein. In some implementations, program code 26 can be downloadable and stored on a hard disk, but the entire program code, or portions thereof, also can be stored in any other volatile or non-volatile memory medium or device as is well known, such as a read-only memory (ROM) or random-access memory (RAM), or provided on any media capable of storing program code, such as any type of rotating media including floppy disks, optical discs, digital video discs (DVDs), compact discs (CDs), microdrives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, virtual private network (VPN), local area network (LAN), etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known.

Figure 1B:
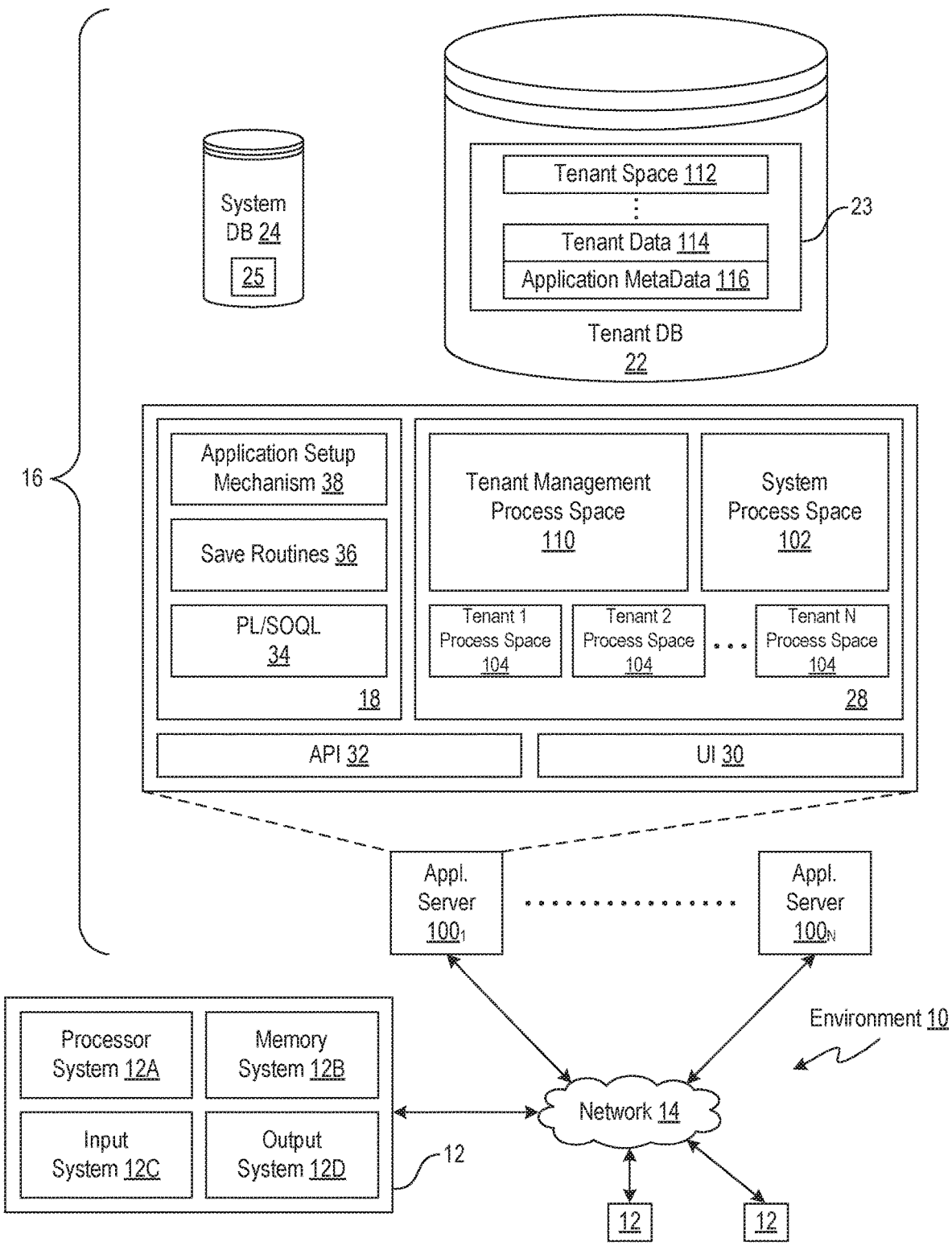
FIG. 1B illustrates example implementations of elements of FIG. 1A and example interconnections between these elements according to some embodiments.

FIG. 1B illustrates a block diagram of example implementations of elements of FIG. 1A and example interconnections between these elements according to some implementations. That is, FIG. 1B also illustrates environment 10, but in FIG. 1B, various elements of database system 16 and various interconnections between such elements are shown with more specificity according to some more specific implementations. In some implementations, database system 16 may not have the same elements as those described herein or may have other elements instead of, or in addition to, those described herein.

In FIG. 1B, user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, network interface 20 is implemented as a set of HTTP application servers $100_1$-$100_N$. Each application server 100, also referred to herein as an "app server," is configured to communicate with tenant database 22 and tenant data 23 stored therein, as well as system database 24 and system data 25 stored therein, to serve requests received from user systems 12. Tenant data 23 can be divided into individual tenant storage spaces 112, which can be physically or logically arranged or divided. Within each tenant storage space 112, tenant data 114 and application metadata 116 can similarly be allocated for each user. For example, a copy of a user's most recently used (MRU) items can be stored in tenant data 114. Similarly, a copy of MRU items for an entire organization that is a tenant can be stored to tenant space 112.

Database system 16 of FIG. 1B also includes a user interface (UI) 30 and an application programming interface (API) 32. Process space 28 includes system process space 102, individual tenant process spaces 104 and a tenant management process space 110. Application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process space 110, for example. Invocations to such applications can be coded using procedural language for structured query language (PL/SQL) 34, which provides a programming language style interface extension to the API 32. A detailed description of some PL/SQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, issued on Jun. 1, 2010, and hereby incorporated by reference herein in its entirety and for all purposes. Invocations to applications can be detected by one or more system processes, which manage retrieving application metadata 116 for the subscriber making the invocation and executing the metadata as an application in a virtual machine.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_2$ can be coupled via a direct network link, and another application server $100_N$ can be coupled by yet a different network connection. Transfer Control Protocol and Internet Protocol (TCP/IP) are examples of typical protocols that can be used for communicating between application servers 100 and database system 16. However, it will be apparent to one skilled in the art that other transport protocols can be used to optimize database system 16 depending on the network interconnections used.

In some implementations, each application server 100 is configured to handle requests for any user associated with any organization that is a tenant of database system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between application servers 100 and user systems 12 to distribute requests to application servers 100. In one implementation, the load balancer uses a least-connections algorithm to route user requests to application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, database system 16 can be a multi-tenant system in which database system 16 handles storage of, and access to, different objects, data, and applications across disparate users and organizations.

In some embodiments, server 100 includes one or more of repository 404, continuous deployment pipeline 410, configuration manager 422 and/or agents 428, . . . 430, as described herein.

In one example storage use case, one tenant can be a company that employs a sales force where each salesperson uses database system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed database system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, database system 16 also can maintain system level data usable by multiple tenants or other data. Such system level data can include industry reports, news, postings, and the like that are sharable among tenants.

In some implementations, user systems 12 (which also can be client systems) communicate with application servers 100 to request and update system-level and tenant-level data from database system 16. Such requests and updates can involve sending one or more queries to tenant database 22 or system database 24. Database system 16 (for example, an application server 100 in database system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, issued on Aug. 17, 2010, and hereby incorporated by reference herein in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
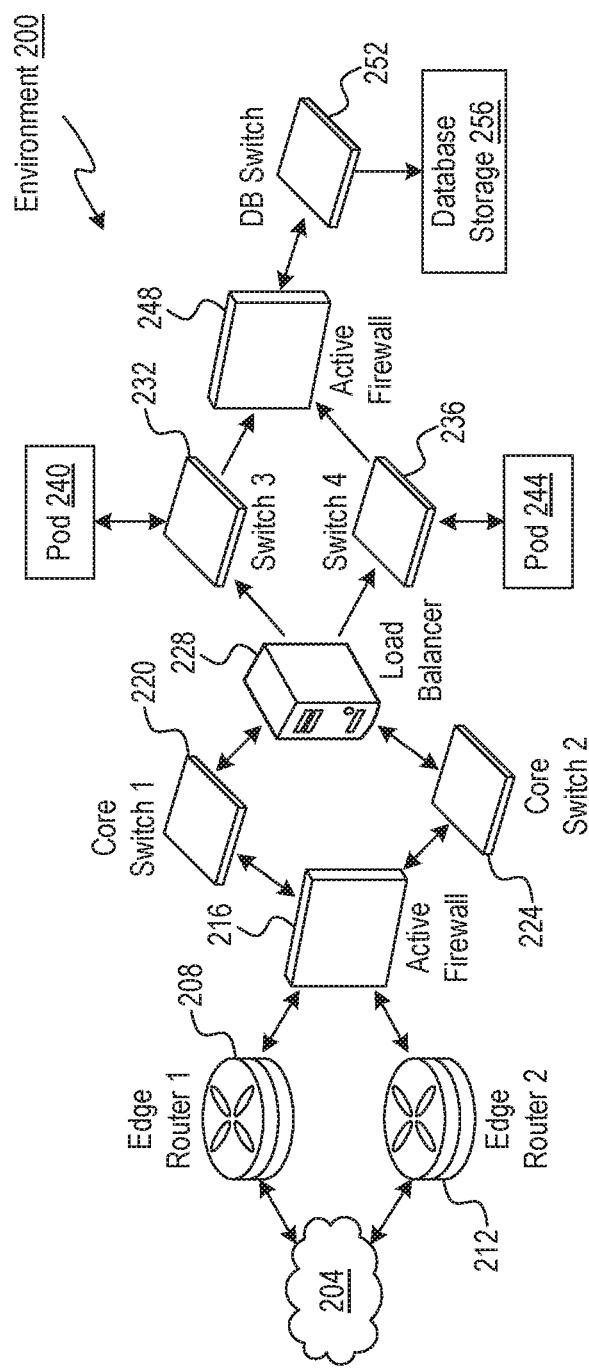
FIG. 2A illustrates example architectural components of an on-demand database service environment according to some embodiments.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. Pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
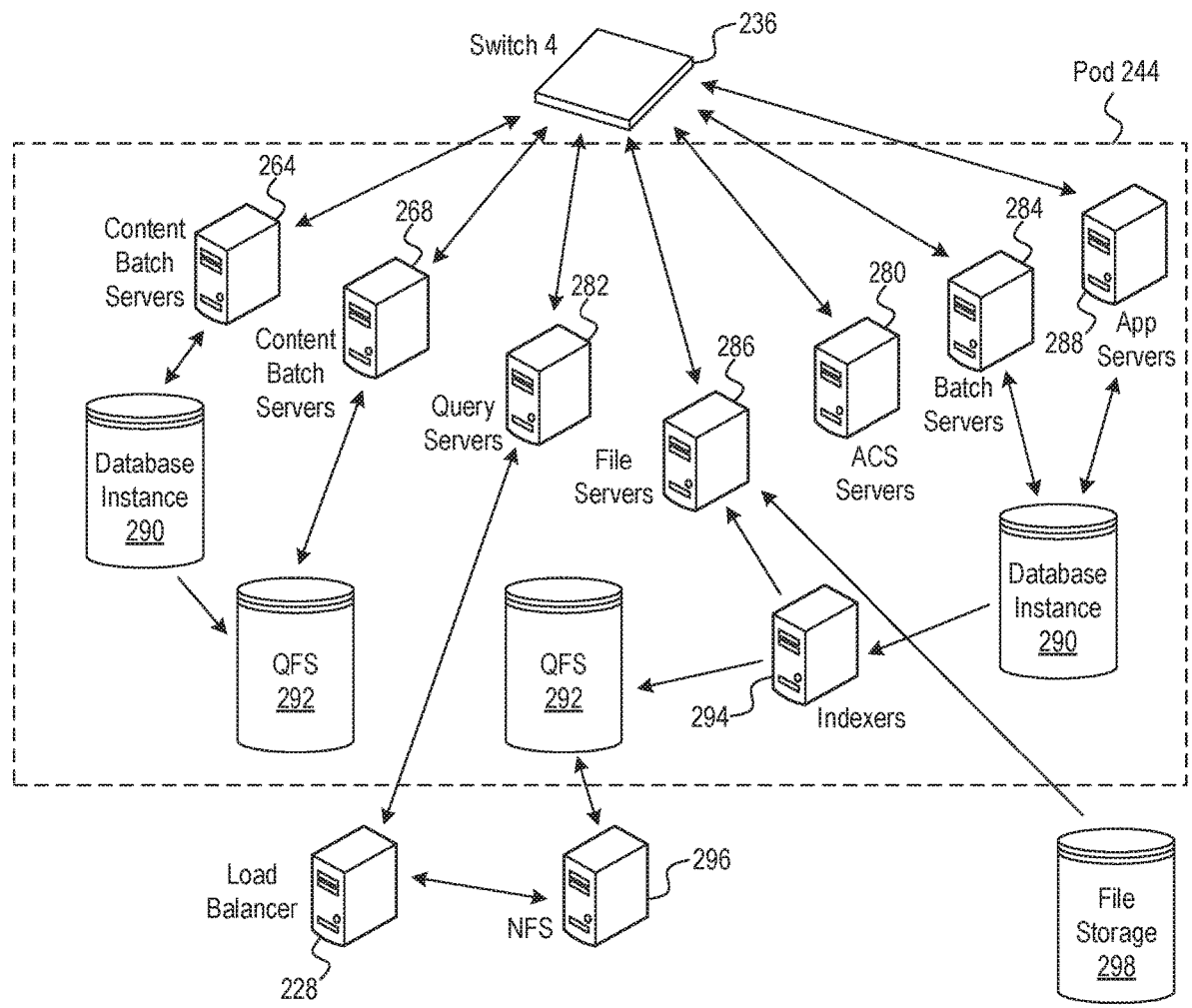
FIG. 2B illustrates example architectural components of an on-demand database service environment according to some embodiments.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to many devices of each type. Also, the on-demand database service environment need not include each device shown in FIGS. 2A and 2B or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server," "device," and "processing device" as used herein are not limited to a single hardware device; rather, references to these terms can include any suitable combination of hardware and software configured to provide the described functionality.

Cloud 204 is intended to refer to a data network or multiple data networks, often including the Internet. Client machines communicably connected with cloud 204 can communicate with other components of the on-demand database service environment 200 to access services provided by the on-demand database service environment. For example, client machines can access the on-demand database service environment to retrieve, store, edit, or process information. In some implementations, edge routers 208 and 212 route packets between cloud 204 and other components of the on-demand database service environment 200. For example, edge routers 208 and 212 can employ the Border Gateway Protocol (BGP). The BGP is the core routing protocol of the Internet. Edge routers 208 and 212 can maintain a table of Internet Protocol (IP) networks or 'prefixes,' which designate network reachability among autonomous systems on the Internet.

In some implementations, firewall 216 can protect the inner components of the on-demand database service environment 200 from Internet traffic. Firewall 216 can block, permit, or deny access to the inner components of on-demand database service environment 200 based upon a set of rules and other criteria. Firewall 216 can act as one or more of a packet filter, an application gateway, a stateful filter, a proxy server, or any other type of firewall.

In some implementations, core switches 220 and 224 are high-capacity switches that transfer packets within the on-demand database service environment 200. Core switches 220 and 224 can be configured as network bridges that quickly route data between different components within the on-demand database service environment. In some implementations, the use of two or more core switches 220 and 224 can provide redundancy or reduced latency.

In some implementations, pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between pods 240 and 244 is conducted via pod switches 232 and 236. Pod switches 232 and 236 can facilitate communication between pods 240 and 244 and client machines communicably connected with cloud 204, for example, via core switches 220 and 224. Also, pod switches 232 and 236 may facilitate communication between pods 240 and 244 and database storage 256. In some implementations, load balancer 228 can distribute workload between pods 240 and 244. Balancing the on-demand service requests between the pods can assist in improving the use of resources, increasing throughput, reducing response times, or reducing overhead. Load balancer 228 may include multilayer switches to analyze and forward traffic.

In some implementations, access to database storage 256 is guarded by a database firewall 248. Database firewall 248 can act as a computer application firewall operating at the database application layer of a protocol stack. Database firewall 248 can protect database storage 256 from application attacks such as SQL injection, database rootkits, and unauthorized information disclosure. In some implementations, database firewall 248 includes a host using one or more forms of reverse proxy services to proxy traffic before passing it to a gateway router. Database firewall 248 can inspect the contents of database traffic and block certain content or database requests. Database firewall 248 can work on the SQL application level atop the TCP/IP stack, managing applications' connection to the database or SQL management interfaces as well as intercepting and enforcing packets traveling to or from a database network or application interface.

In some implementations, communication with database storage 256 is conducted via database switch 252. Multitenant database storage 256 can include more than one hardware or software components for handling database queries. Accordingly, database switch 252 can direct database queries transmitted by other components of the on-demand database service environment (for example, pods 240 and 244) to the correct components within database storage 256. In some implementations, database storage 256 is an on-demand database system shared by many different organizations as described above with reference to FIGS. 1A and 1B.

FIG. 2B shows a system diagram further illustrating example architectural components of an on-demand database service environment according to some implementations. Pod 244 can be used to render services to a user of on-demand database service environment 200. In some implementations, each pod includes a variety of servers or other systems. Pod 244 includes one or more content batch servers 264, content search servers 268, query servers 282, file servers 286, access control system (ACS) servers 280, batch servers 284, and app servers 288. Pod 244 also can include database instances 290, quick file systems (QFS) 292, and indexers 294. In some implementations, some or all communication between the servers in pod 244 can be transmitted via pod switch 236.

In some implementations, app servers 288 include a hardware or software framework dedicated to the execution of procedures (for example, programs, routines, scripts) for supporting the construction of applications provided by on-demand database service environment 200 via pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

In an embodiment, one or more of continuous deployment pipeline 410, configuration manager 422, and/or agents 428 . . . 430, as described below are executed by app servers 288.

Content batch servers 264 can handle requests internal to the pod. Some such requests can be long-running or not tied to a particular customer. For example, content batch servers 264 can handle requests related to log mining, cleanup work, and maintenance tasks. Content search servers 268 can provide query and indexer functions. For example, the functions provided by content search servers 268 can allow users to search through content stored in the on-demand database service environment. File servers 286 can manage requests for information stored in file storage 298. File storage 298 can store information such as documents, images, and binary large objects (BLOBs). In some embodiments, file storage 298 is a shared storage. By managing requests for information using file servers 286, the image footprint on the database can be reduced. Query servers 282 can be used to retrieve information from one or more file systems. For example, query servers 282 can receive requests for information from app servers 288 and transmit information queries to network file systems (NFS) 296 located outside the pod.

Pod 244 can share a database instance 290 configured as a multi-tenant environment in which different organizations share access to the same database. Additionally, services rendered by pod 244 may call upon various hardware or software resources. In some implementations, ACS servers 280 control access to data, hardware resources, or software resources. In some implementations, batch servers 284 process batch jobs, which are used to run tasks at specified times. For example, batch servers 284 can transmit instructions to other servers, such as app servers 288, to trigger the batch jobs.

In some implementations, QFS 292 is an open source file system available from Sun Microsystems, Inc. The QFS can serve as a rapid-access file system for storing and accessing information available within the pod 244. QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in NFS 296 or other storage systems.

In some implementations, one or more query servers 282 communicate with the NFS 296 to retrieve or update information stored outside of the pod 244. NFS 296 can allow servers located in pod 244 to access information to access files over a network in a manner similar to how local storage is accessed. In some implementations, queries from query servers 282 are transmitted to NFS 296 via load balancer 228, which can distribute resource requests over various resources available in the on-demand database service environment. NFS 296 also can communicate with QFS 292 to update the information stored on NFS 296 or to provide information to QFS 292 for use by servers located within pod 244.

In some implementations, the pod includes one or more database instances 290. Database instance 290 can transmit information to QFS 292. When information is transmitted to the QFS, it can be available for use by servers within pod 244 without using an additional database call. In some implementations, database information is transmitted to indexer 294. Indexer 294 can provide an index of information available in database instance 290 or QFS 292. The index information can be provided to file servers 286 or QFS 292. In some embodiments, there may be a plurality of database instances stored and accessed throughout the system.

Figure 3:
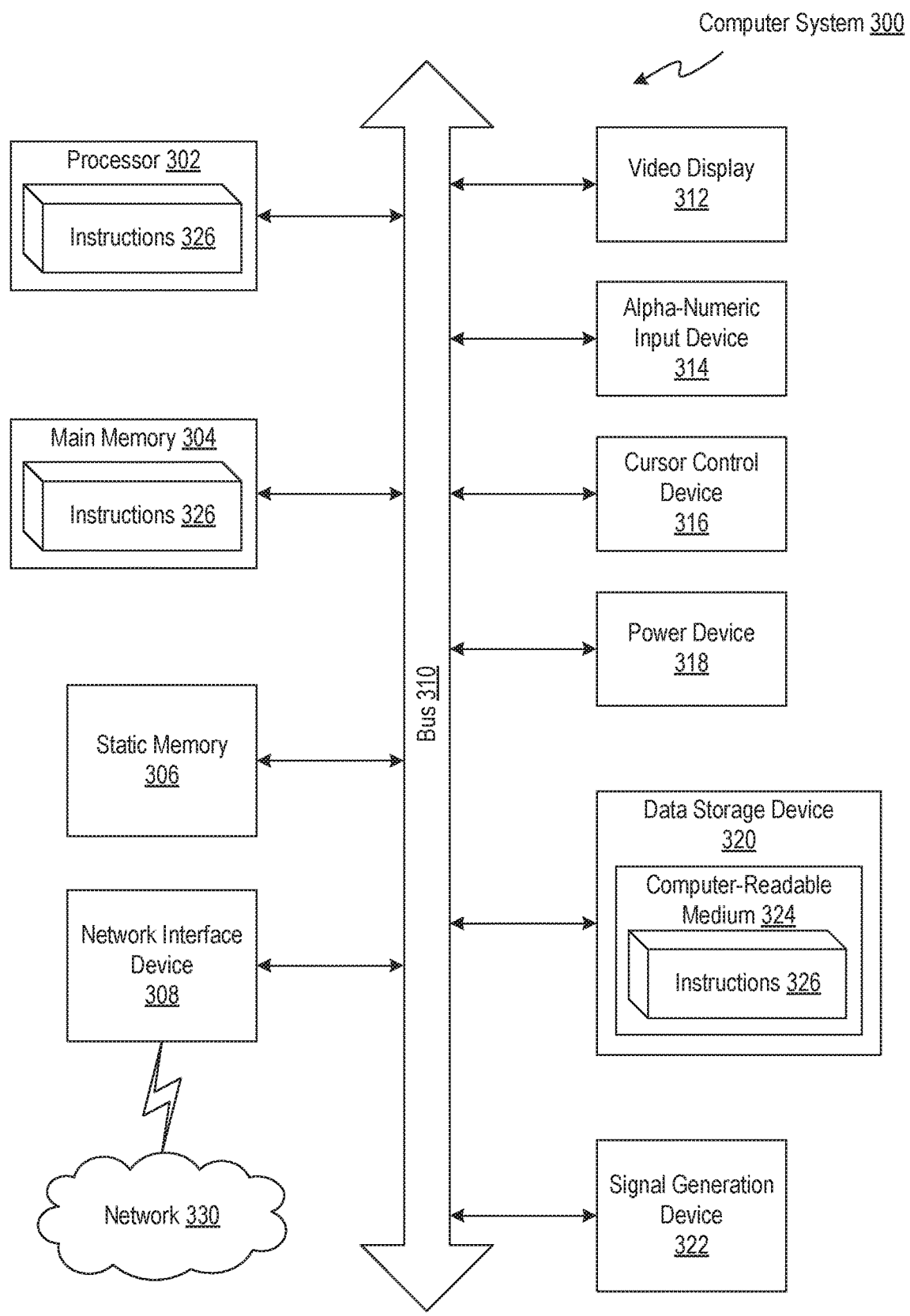
FIG. 3 is a diagrammatic representation of a machine in the exemplary form of a computer system within which one or more embodiments may be carried out.

FIG. 3 illustrates a diagrammatic representation of a machine in the exemplary form of a computer system 300 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 300 may be utilized by or illustrative of any of the electronic components described herein (e.g., any of the components illustrated in or described with respect to FIGS. 1A, 1B, 2A, and 2B).

The exemplary computer system 300 includes a processing device (processor) 302, a main memory 304 (e.g., ROM, flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 320, which communicate with each other via a bus 310.

Processor 302 represents one or more general-purpose processing devices such as a microprocessor, central processing unit, or the like. More particularly, processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 302 may also be one or more special-purpose processing devices such as an application specific integrated circuit (ASIC), a field programmable gate array (FPGA), a digital signal processor (DSP), network processor, or the like. Processor 302 is configured to execute instructions 326 for performing the operations and steps discussed herein. Processor 302 may have one or more processing cores.

Computer system 300 may further include a network interface device 308. Computer system 300 also may include a video display unit 312 (e.g., a liquid crystal display (LCD), a cathode ray tube (CRT), or a touch screen), an alphanumeric input device 314 (e.g., a keyboard), a cursor control device 316 (e.g., a mouse or touch screen), and a signal generation device 322 (e.g., a loudspeaker).

Power device 318 may monitor a power level of a battery used to power computer system 300 or one or more of its components. Power device 318 may provide one or more interfaces to provide an indication of a power level, a time window remaining prior to shutdown of computer system 300 or one or more of its components, a power consumption rate, an indicator of whether computer system is utilizing an external power source or battery power, and other power related information. In some implementations, indications related to power device 318 may be accessible remotely (e.g., accessible to a remote back-up management module via a network connection). In some implementations, a battery utilized by power device 318 may be an uninterruptable power supply (UPS) local to or remote from computer system 300. In such implementations, power device 318 may provide information about a power level of the UPS.

Data storage device 320 may include a tangible computer-readable storage medium 324 (e.g., a non-transitory computer-readable storage medium) on which is stored one or more sets of instructions 326 (e.g., software) embodying any one or more of the methodologies or functions described herein. Instructions 326 may also reside, completely or at least partially, within main memory 304 and/or within processor 302 during execution thereof by computer system 300, main memory 304, and processor 302 also constituting computer-readable storage media. Instructions 326 may further be transmitted or received over a network 330 (e.g., network 14) via network interface device 308.

In one implementation, instructions 326 include instructions for performing any of the implementations of configuration manager 422 and/or agents 428 . . . 430 as described herein. While computer-readable storage medium 324 is shown in an exemplary implementation to be a single medium, it is to be understood that computer-readable storage medium 324 may include a single medium or multiple media (e.g., a centralized or distributed database, and/or associated caches and servers) that store the one or more sets of instructions.

Figure 4:
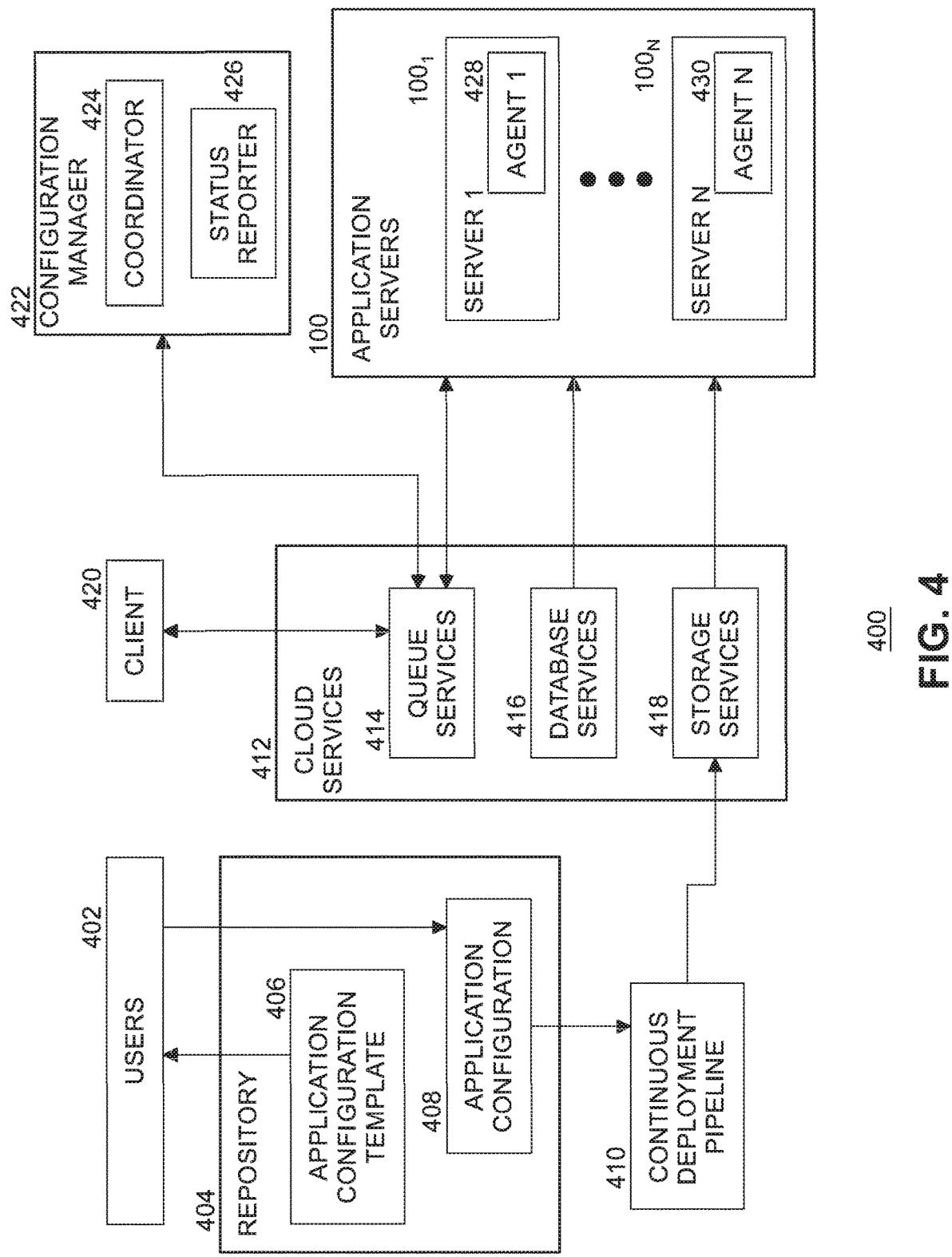
FIG. 4 is a diagram of an example system for application configuration according to some embodiments.

FIG. 4 is a diagram of an example system 400 for application configuration according to some embodiments. One or more users 402 reads one of a plurality of application configuration templates 406 from a repository 404. Repository 404 is a collection of one or more application configuration templates and/or application configurations. There may be any number of application configuration templates and/or application configurations stored in repository 404, and each application configuration template and/or application configuration is uniquely identified. In an embodiment, repository 404 is stored in any available and accessible storage system in cloud computing environment 10. In an embodiment, a user may be a system administrator of the cloud computing environment. The user modifies the application configuration template as needed to produce an application configuration. In an embodiment, this includes editing code represented as text in a file. In an embodiment, application configuration 408 is written in a programming language, such as Python, JavaScript Object Notation, JSON, Yet Another Markup Language (YAML), or other suitable language. In an embodiment, application configuration 408 includes a script. In an embodiment, application configuration 408 includes key:value pairs of parameters.

An example of an application configuration template is shown below.
© 2020 salesforce.com, inc.
def precheck(params):
   execute some checks
   if all checks passed: return True,"Precheck passed"
   Else: return False, <error string>
def start(params):
   start executing the application configuration (configuration template)
def status(params):
   calculate status of the application configuration (configuration template) that was started by above function.
   return the status
def collect_and_ship(params):
   create list of files that need to be shipped out of this host
   return the list
def stop( ):
   stop the execution of application configuration (configuration template) started above An example of an application configuration is shown below.
© 2020 salesforce.com, inc.
import time
import logging
import random
import string
from subprocess import Popen, PIPE
counter=0
counter_end=60
end=False
def randomStringwithDigitsAndSymbols(stringLength=10):
   """"Generate a random string of letters, digits and special characters"""""
   random_chars=[random.choice(string.ascii letters) for i in range(stringLength–5)]+[random.choice(string.digits) for i in range(3)]
   random.shuffle(random_chars)
   my_password="R #"+".join(random_chars)
   return my_password
def precheck(params):
   return True, "Precheck passed"
def start(params):
   logging.info('configuration 1 starts')
   sudo_command='sudo su–oracle–c'.split( )
   command="sqlplus–S/as sysdba"
   my_command=sudo_command
   my_command.append(command)
   rand_pwd=randomStringwithDigitsAndSymbols(16)
   p=Popen(my_command, stdin=PIPE, stdout=PIPE, stderr=PIPE, universal newlines=True) query='"
SET HEAD OFF
SET FEEDBACK OFF
SET LINES 1000
ALTER USER SYSTEM IDENTIFIED BY "% s";
exit;
""% rand_pwd
   p.stdin.write(query)
   stdout_data=p.communicate( )
   print(stdout_data, p.returncode)
   global counter
   with open('/tmp/task_run', 'a+') as f:
     f.write(f {rand_pwd}')
     f.flush( )
     while not end and counter<counter_end:
       counter+=1
       f.write(f'\n{counter}')
       f.flush( )
def status(params):
   logging.debug(f'Status: Counter: {counter}')
   with open('/tmp/task_run', 'r') as f:
     lines=f.readlines( )
     counter_value=lines[–1]
     logging.debug(f'status( ) counter_value: {counter_value}')
     if counter_value==str(counter_end):
       return 'completed', '100', 'Demo Task has completed'
     else:
       return 'in progress', counter_value, 'Demo Task in progress'
def collect_and_ship(params):
   logging.debug(f Executing collect_and_ship( ))
   return [ ]
def stop( )
   logging.debug('stopping configuration1')
   global end
   end=True Whenever an application configuration 408 is created and/or updated, continuous deployment pipeline 410 retrieves the application configuration and stores the application configuration for subsequent use by calling one of storage services 418 provided by cloud services 412. In one embodiment, continuous deployment pipeline 410 is implemented with Spinnaker, an open source, multi-cloud continuous delivery platform for releasing software changes, available at spinnaker.io. In other embodiments, other implementations of continuous deployment pipeline 410 may be used. In an embodiment, cloud services 412 is Amazon Web Services, although public cloud services from other providers may also be used. In an embodiment, storage services 418 is AWS S3, a service that provides object storage through a web service interface, although storage services from other providers may also be used. In one embodiment, repository 404 is stored in or by storage services 418. Client 420 interacts with cloud services 412 to input messages and receive messages by inserting messages into message queues and reading messages from message queues. In an embodiment, queue services 414 is AWS Simple Queue Services (SQS), a distributed message queuing service, although queueing services and/or communication services from other providers may also be used. Cloud services 412 also includes database services 416 to providing for read and writing of one or more databases. In an embodiment, database services store a history of application configuration templates that have been applied by agents on target servers. This may be useful for auditing purposes. In embodiment, database services 416 is implemented as an AWS Relational Database. In an embodiment, client 420 is one or more of users 402. In another embodiment, client 420 is any component of cloud computing environment 10 (including any executing software component). Client 420 directs that a selected application configuration 408 be applied to a selected application binary image (not shown in FIG. 4) resident on one or more application servers 100 by sending a first message including a first event via queue services 414 to configuration manager 422. An event is a notification that a selected task is to be performed (e.g., configure a selected application binary image stored on a selected server with the parameters defined in a selected application configuration 408).

In response to receiving the first event, configuration manager 422 sends a second message including a second event to a selected one or more agents 428 . . . 430 in one or more servers $100_1$ . . . $100_N$, respectively, to configure one or more applications. The one or more selected agents apply the selected application configuration 408 (as read from storage services 418 and identified by the first and second messages) to a selected application binary image (not shown in FIG. 4) previously stored on a server. The one or more agents send a status notification in a third message back to configuration manager 422. Configuration manager 422 sends a status notification in fourth message back to the requesting client 420. In one embodiment, configuration manager 422 includes coordinator 424 to coordinate applying configurations to application binary images on servers and status reporter 426 to report status information back to requesting clients. In another embodiment, coordinator 424 and status reporter 426 are combined into a single component. In various embodiments, N is a natural number, and the number of servers and associated agents is implementation dependent (e.g., depending on the size of the cloud computing environment).

Figure 5:
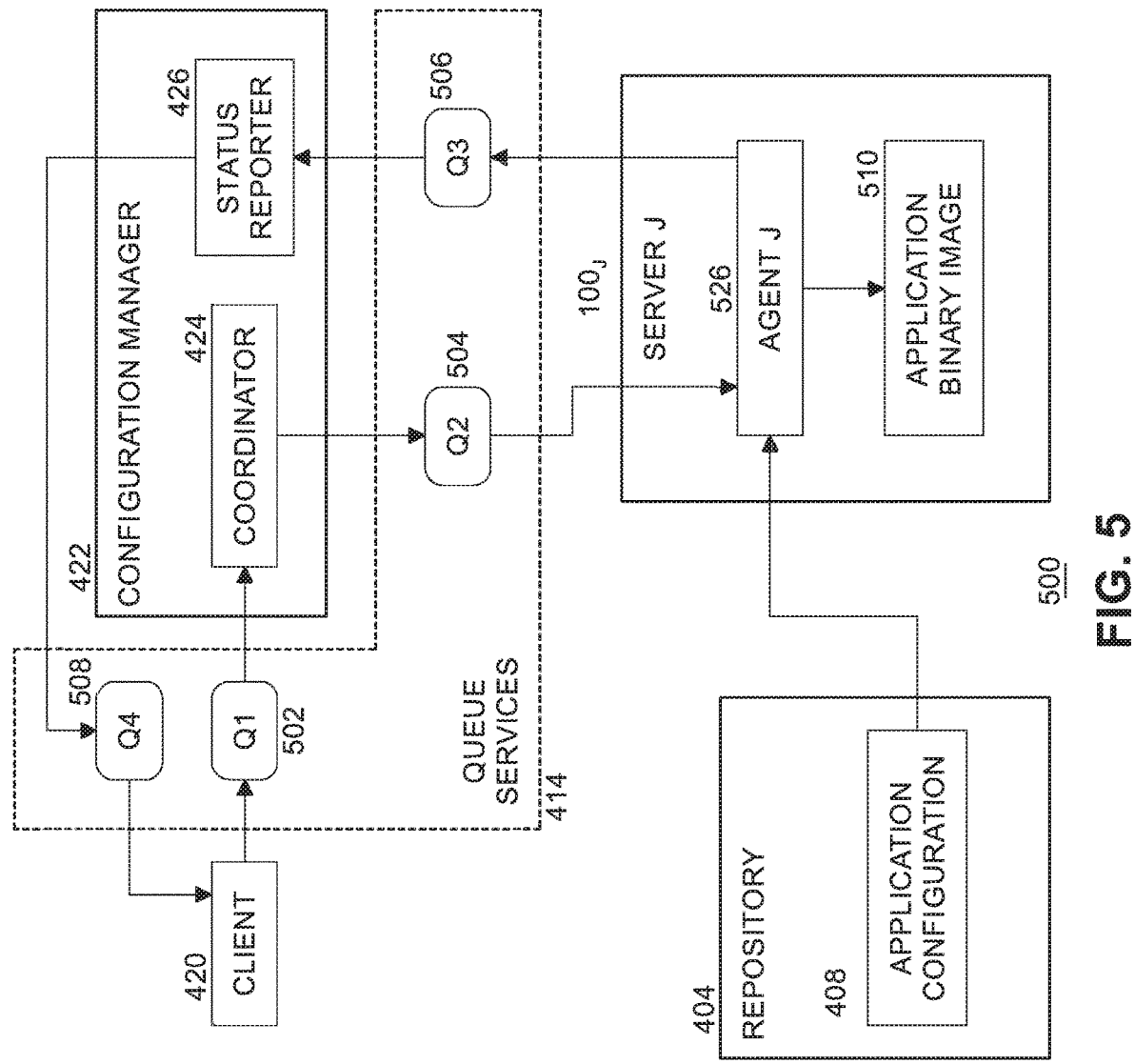
FIG. 5 is a diagram of another example system for application configuration according to some embodiments.

FIG. 5 is a diagram of another example system 500 for application configuration according to some embodiments. FIG. 5 shows the interaction of components using a plurality of message queues according to some embodiments. When client 420 wants to configure a selected application binary image 510 resident on a selected server J $100_J$, client 420 sends the first message including an event to coordinator 424 using a first queue, Q1 502. Coordinator 424 reads the first message from Q1 502, validates the first message, transforms the first message into a second message, and publishes the second message to a second queue, Q2 504. Agent J 526 (as identified by the second message) executing on server J reads the second message, validates the second message, transforms the second message, downloads a selected application configuration 408 from repository 404, executes the selected application configuration, and sends the third message to status reporter 426 using third queue Q3 506. Status reporter 426 reads the third message from Q3 506, validates the third message, transforms the third message into a fourth message, and publishes the fourth message to a fourth queue, Q4 508. Client 420 then reads the fourth message from Q4 508.

In an embodiment, management of queues Q1 502, Q2 504, Q3 506, and Q4 58 are handled by queue services 414. In an embodiment, unidirectional queues Q1 502 and Q4 508 may be combined into one bi-directional queue. In an embodiment, unidirectional queues Q2 504 and Q3 506 may be combined into one bi-directional queue. In an embodiment, there are a plurality of queues for communicating messages between a plurality of clients 420 and configuration manager 422, and a plurality of queues for communicating messages between configuration manager 422 and a plurality of agents (agent 1 428 . . . agent N 430). In an embodiment, there may be any number of application binary images per server, and servers may be situated in any data center anywhere in the world.

Figure 6:
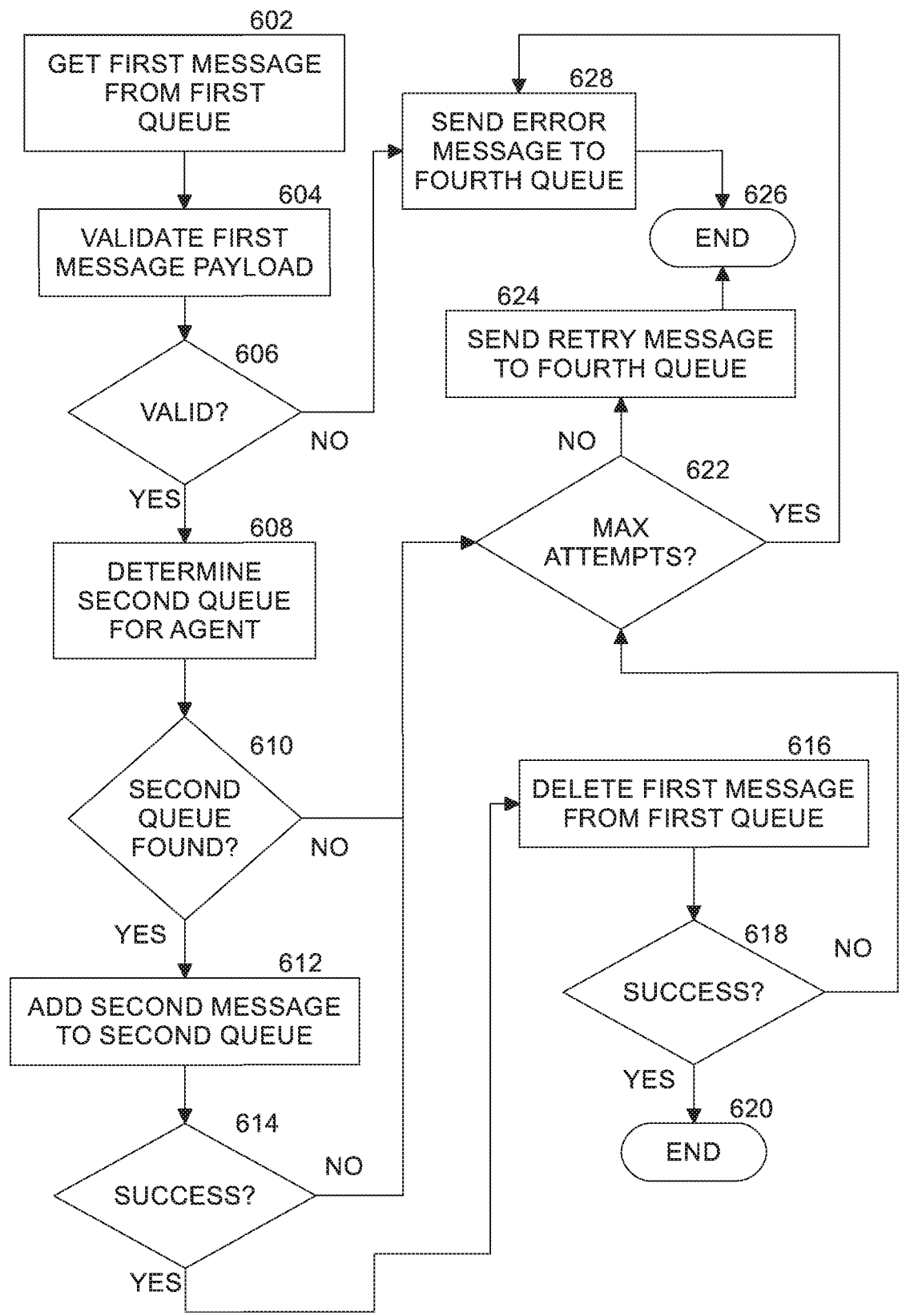
FIG. 6 is a flow diagram of example processing of a coordinator in an application configuration system according to some embodiments.

FIG. 6 is a flow diagram 600 of example processing of coordinator 424 in an application configuration system 500 according to some embodiments. At block 602, coordinator 424 gets a first message from first queue Q1 502. At block 604, coordinator 424 validates the first message payload. At block 606, if the first message payload is not valid, coordinator 424 instructs status reporter 426 to send an error notification in a fourth message to fourth queue Q4 508 at block 628, coordinator deletes the first message from the first queue Q1 502, and processing ends at block 626. If the first message payload is valid at block 606, coordinator 424 determines a second queue Q2 504 associated with an agent or server (e.g., agent J 526 or server J $100_J$) identified in the first message payload. Coordinator 424 transforms the first message into a second message. Coordinator 424 processes the first message to identify the target pod in the cloud computing environment where the message needs to be dispatched to the agent. In an embodiment, each pod has a dedicated second queue Q2 504. To transform as used herein means to construct the second message from the first message. At block 610, if the second queue is found, then coordinator 424 adds the second message to second queue Q2 504 at block 612. If adding the second message was successful at block 614, then coordinator 424 deletes the first message from first queue Q1 502 at block 616. If deletion of the first message was successful at block 618, then processing ends at block 620. If the second queue was not found at block 610, the second message was not successfully added to the second queue at block 614, or the first message was not successfully deleted from the first queue at block 618, then processing continues at block 622. At block 622, if the maximum number of attempts to process the first message has been reached, then coordinator 424 instructs status reporter 426 to send an error notification in a fourth message to fourth queue Q4 508 at block 628 and processing ends at block 626. At block 622, if the maximum number of attempts has not been reached, then coordinator 422 instructs status reporter 426 to send a retry notification in a fourth message to fourth queue Q4 508 at block 624, and processing ends at block 626. Upon receiving a retry notification, client 420 retries sending the first message.

An example of pseudo-code for coordinator 424 is shown below.

```
© 2020 salesforce.com, inc.
for each customer-task queue:
    while true:
        retrieve any new messages
        if message received:
            validate message attributes
            if above validation fails:
                log the error and send the error message to Q4 628
            validate the message payload
            if message validation fails:
                create new message with failure details
            else:
                create new message based on the incoming message
            get cell-name value from message attributes
            construct outbound queue URL where workers are listening at
            if outbound queue is reachable:
                publish the new message to outbound queue Q2 504
                where agents are listening at
            else:
                after pre-defined retries, create new message with failure details
                publish the message to Q4 628
            delete source message from Q1 502
        else:
            sleep for pre-defined time
```

Figure 7:
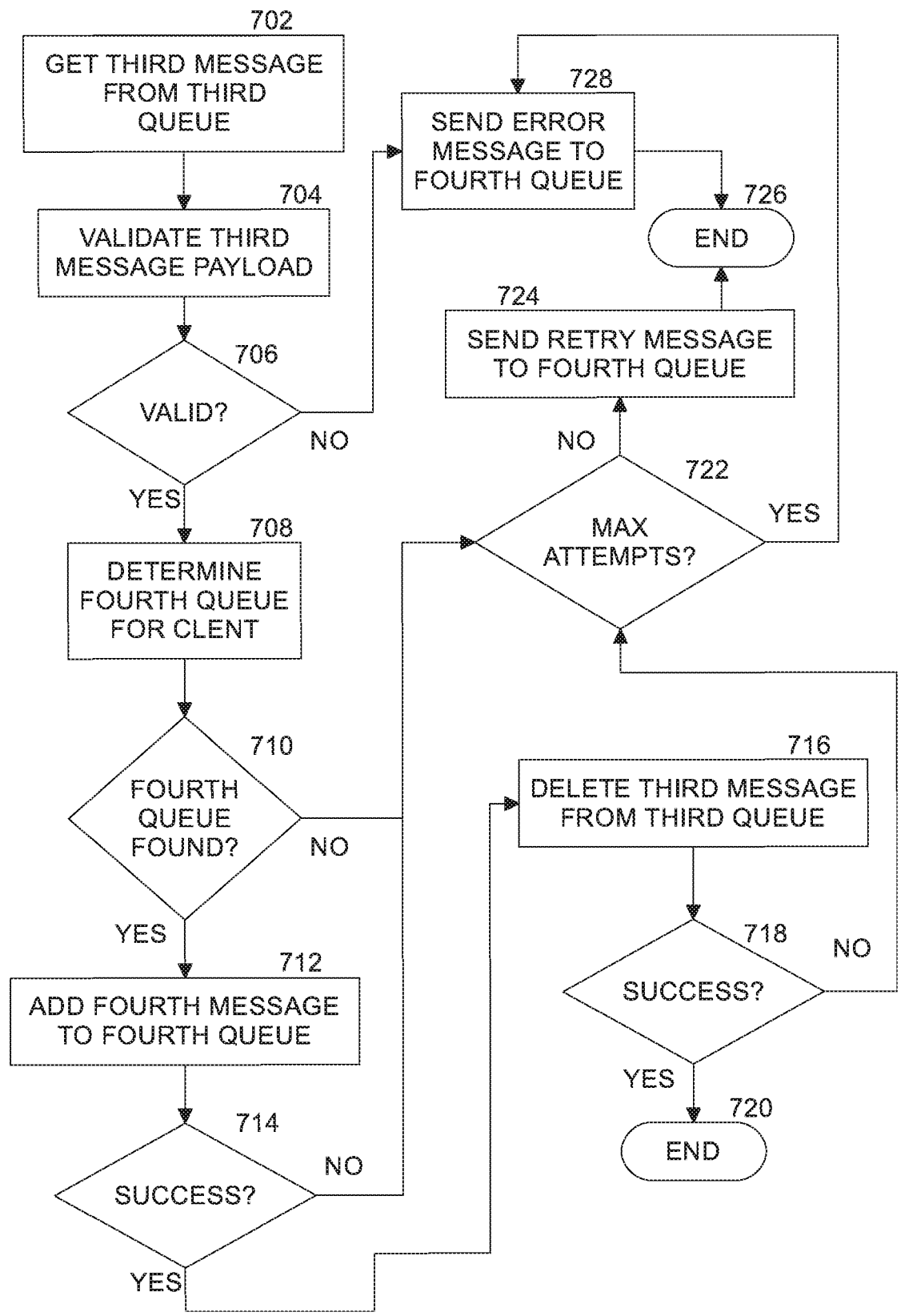
FIG. 7 is a flow diagram of example processing of a status reporter in an application configuration system according to some embodiments.

FIG. 7 is a flow diagram 700 of example processing of status reporter 426 in an application configuration system 500 according to some embodiments. At block 702, status reporter 426 gets a third message from third queue Q3 506. At block 704, status reporter 426 validates the third message payload. At block 706, if the third message payload is not valid, status reporter 426 sends an error notification in a fourth message to fourth queue Q4 508 at block 728, the status reporter deletes the third message from the third queue, and processing ends at block 726. If the third message payload is valid at block 706, status reporter 426 determines a fourth queue Q4 508 associated with client 420 identified in the third message payload. Status reporter 426 transforms the third message into a fourth message. To transform as used herein is to construct the fourth message from the third message. The fourth message is the response being sent back to the client. At block 710, if the fourth queue is found, then status reporter 426 adds the fourth message to fourth queue Q4 508 at block 712. If adding the fourth message was successful at block 714, then status reporter 426 deletes the third message from third queue Q3 506 at block 716. If deletion of the third message was successful at block 718, then processing ends at block 720. If the fourth queue was not found at block 710, the fourth message was not successfully added to the fourth queue at block 614, or the third message was not successfully deleted from the third queue at block 718, then processing continues at block 722. At block 722, if the maximum number of attempts to process the third message has been reached, then status reporter 426 sends an error notification in a fourth message to fourth queue Q4 508 at block 728 and processing ends at block 726. At block 722, if the maximum number of attempts has not been reached, then status reporter 426 sends a retry notification in a fourth message to fourth queue Q4 508 at block 724, and processing ends at block 726. Upon receiving a retry notification, client 420 retries sending the message. Retry here involves sending a new request by the client on Q1 to reinitiate the entire flow.

An example of pseudo-code for status reporter 426 is shown below.

```
© 2020 salesforce.com, inc.
with each pod construct the agent status Queue URL for Q3 506
for each agent status queue:
    while true:
        retrieve any new messages
        if message received:
            validate the message payload
            if payload validation fails:
                create new message based on incoming message
                and add failure details
            else:
                create new message based on the incoming message
                and add success details
            using customer name from message payload, construct
            outbound queue URL
            if outbound queue is reachable:
                publish the new message to outbound queue Q4 508
                where clients are
                listening at for status updates
            else:
                after pre-defined retries, create new message
                with failure details
                publish the message to Q4 508
            delete source message from Q3 506
        else:
            sleep for pre-defined time
```

Figure 8:
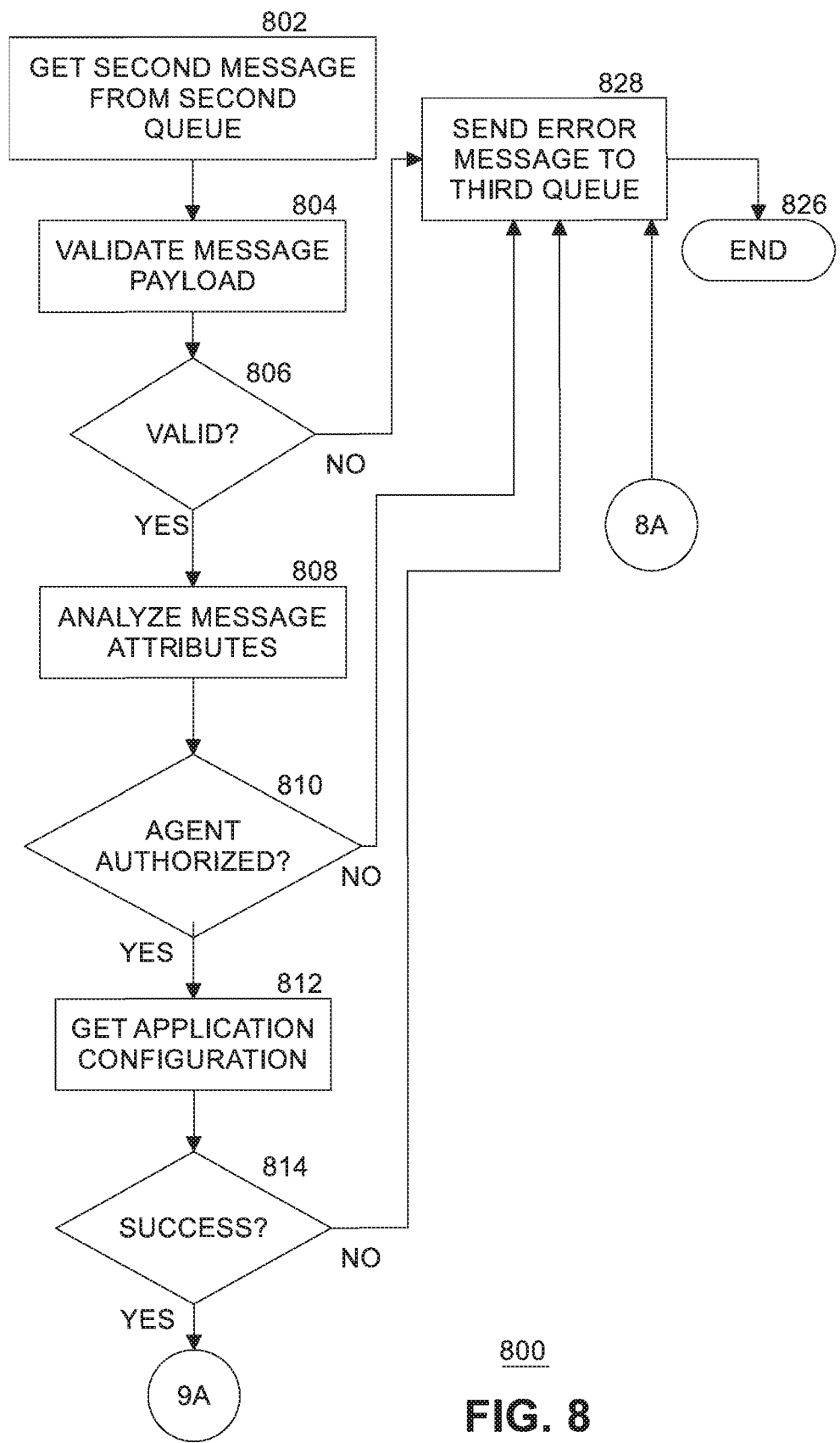
FIGS. 8 and 9 are flow diagrams of example processing of an agent in an application configuration system according to some embodiments.
Figure 9:
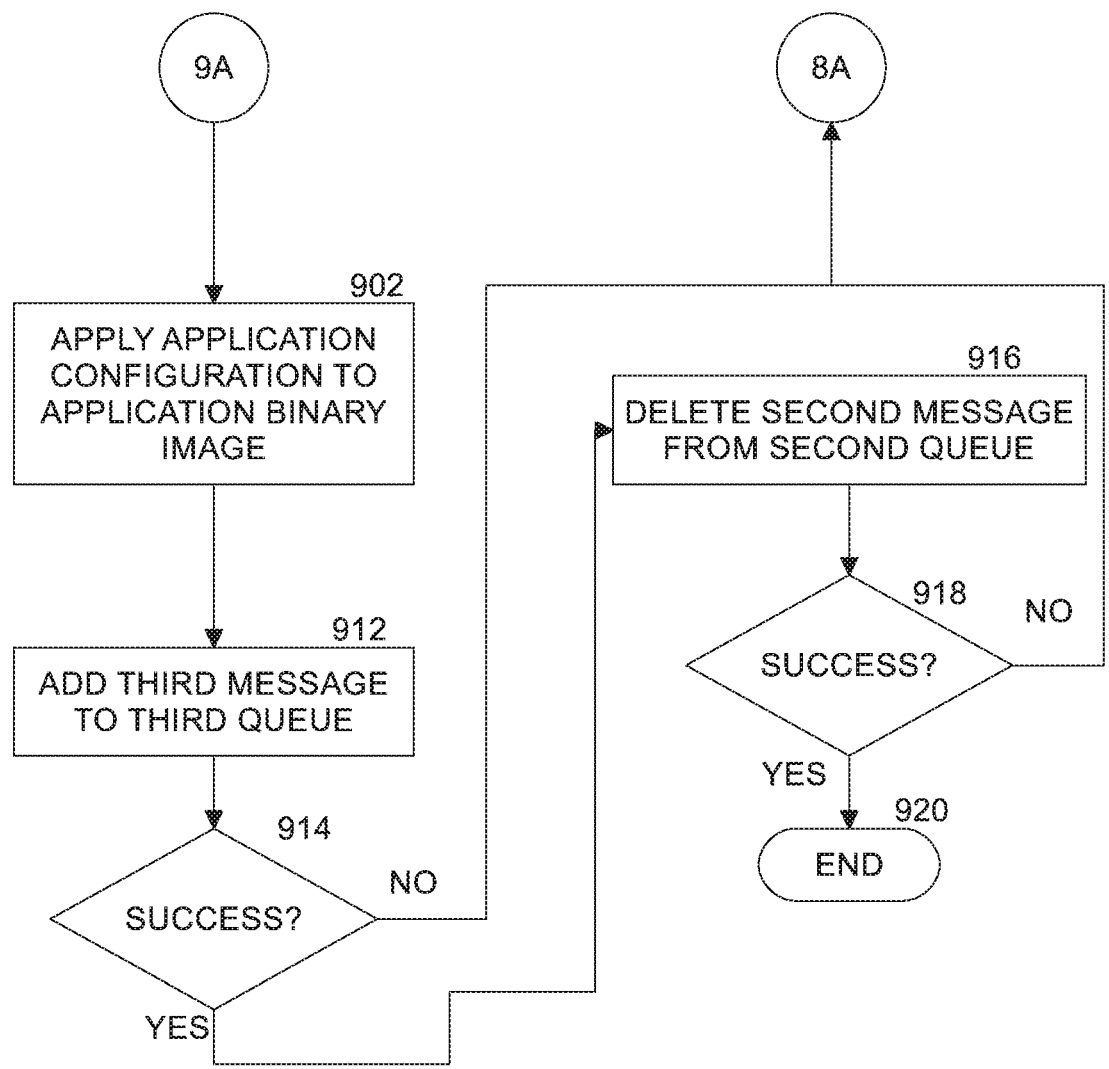

FIGS. 8 and 9 are flow diagrams 800, 900 of example processing of an agent 526 in an application configuration system 500 according to some embodiments. At block 802, agent 526 gets the second message from second queue Q2 504. At block 804, agent 526 validates the message payload. At block 806, if the message payload is valid, agent 526 analyzes the message attributes. In an embodiment, message attributes are structured metadata that can be inserted into each message to allow recipients to review the attributes and avoid processing the message body if allowed. Message attributes include data such as timestamps, digital signatures, and identifiers to allow routing of messages. In an embodiment, message attributes are expressed as a map of key:value pairs. A message body includes all required details for execution of a selected task (e.g., applying an application configuration), such as task area, task subarea, and application configuration name, for example. If the agent is authorized according to the message attributes at block 810, then the agent gets the application configuration 408 identified by the message attributes from repository 404. If the application configuration is successfully retrieved from the repository at block 814, processing continues with block 902 on FIG. 9. If the message payload is invalid at block 806, the agent is not authorized at block 810, or the application configuration is not successfully retrieved, then agent 526 sends an error notification in a third message to third queue Q3 506 at block 828 and processing ends at block 826.

At block 902 of FIG. 9, agent 526 applies the retrieved application configuration 408 to a selected application binary image 510 identified by the message attributes. In this step, Agent J replaces feeds parameter values to the start method of the application configuration template to create the new application configuration file and applies the new configuration to the application binary image. Agent J then signals the application binary image about the change in configuration. At block 912, agent 526 adds a status notification in a third message to third queue Q3 506. The status message indicates the status of applying the application configuration to the application binary image. At block 914, if adding the status message was successful, then agent 526 deletes the second message from the second queue Q2 504 at block 916. If deleting the second message was successful at block 918, then processing ends at block 920. If adding the third message to the third queue or deleting the second message from the second queue was not successful, then processing continues with block 828 on FIG. 8.

An example of pseudo-code for agent J 526 is shown below.

© 2020 salesforce.com, inc.

```
using hostname, retrieve pod name of the pod currently this
    agent belongs to
using the pod name, construct inbound queue URL for Q2
    504
while true:
    retrieve any new messages
    if message received:
        validate message attributes
        if validation fails:
            Log the error and send error message to Q4
            continue the while loop
        else:
            get pod and service values from message attributes
            validate current worker instance is supposed to pro-
                cess this message
            if validation fails:
                log the details and ignore the message
                other (correct) agent instance will pick up the
                    message
                continue the while loop
            from DB service verify if this message is currently
                being processed
            if yes:
                log the details and ignore the message
                continue the while loop
            else:
                create an entry in DB service
            using pod name from incoming message, create out-
                bound queue URL
            if outbound queue is reachable:
                publish the new 'In Progress' message to outbound
                    queue Q3 506
            else:
                after pre-defined retries, create new message with
                    failure details
                publish the message to Q4
                continue the while loop
            validate the message payload
            if payload validation fails:
                create new message based on incoming message and
                    add failure details
                send the created message to Q3 506
                delete source message from Q2 504
                continue the while loop
            else:
                get application configuration name from message
                    payload
                download application configuration from repository,
                load application configuration and start execution
                if any operation from above steps fails:
                    create new message based on incoming message
                        and add failure details
                    send the created message to Q3 506
                    delete source message from Q2 504
                    continue the while loop
                else:
                    periodically call status function of the recipe and
                        get current status
                    construct new message with the latest status
                        details in the payload
                    send the created message to Q3 506
                once application configuration execution completes,
                    construct new message with execution result
                send this final message to Q3 506
                delete source message from Q2 504
    else:
        sleep for pre-defined time
```

Figure 10:
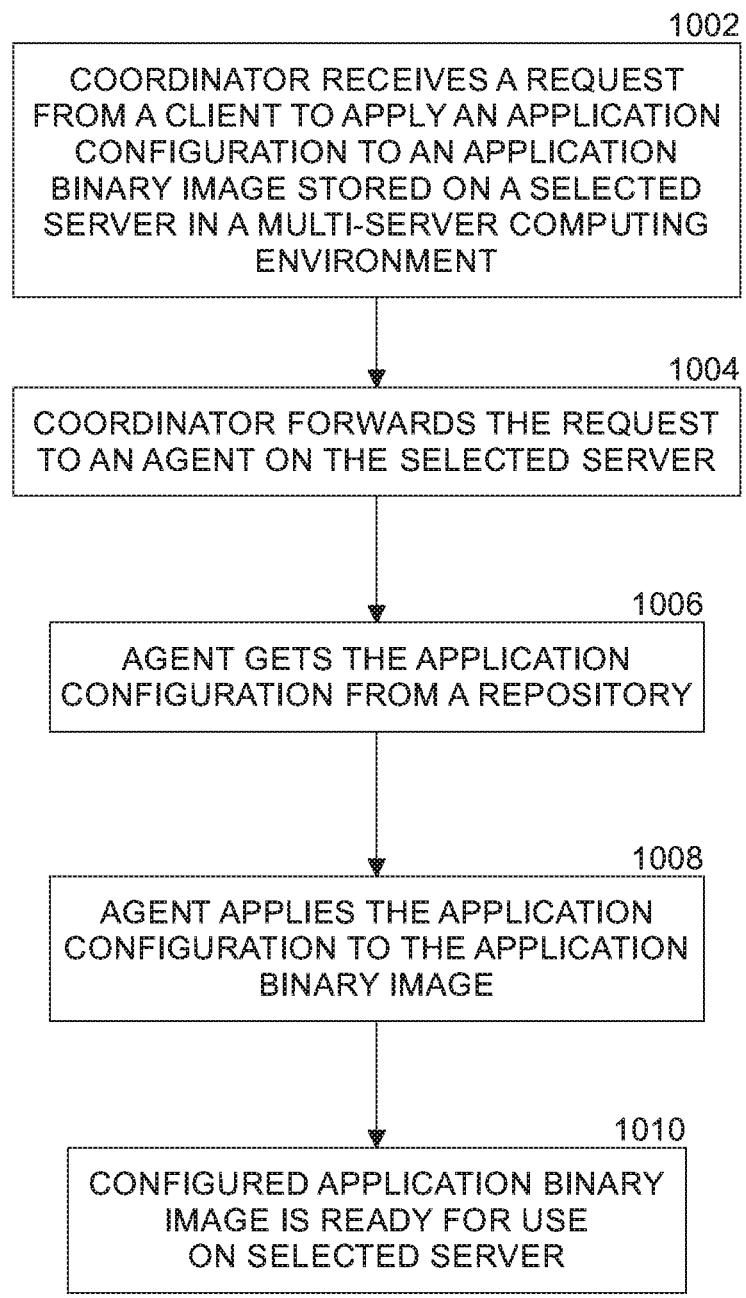
FIG. 10 is a flow diagram of example processing of an application configuration system according to some embodiments.

FIG. 10 is a flow diagram 1000 of example processing of an application configuration system 400 according to some embodiments. At block 1002, coordinator 424 receives a request from a client 420 to apply an application configuration 408 to an application binary image 510 stored on a selected server J 100$_J$ in a multi-server computing environment 10. At block 1004, coordinator 424 forwards the request to an agent J 526 on the selected server J 100$_J$. At block 1006, agent J 526 gets application configuration 408 from a repository 404. At block 1008, agent J 526 applies the application configuration 408 to the application binary image 510. At block 1010, newly configured application binary image 510 is ready for use on selected server J 100$_J$.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which a computing environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™, or Python using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A computer-implemented method comprising:
    receiving, by a configuration manager running in a first server in a multi-server computing environment, a request from a client to apply a selected application configuration to a selected application binary image previously stored on a second server in the multi-server computing environment;
    forwarding, by the configuration manager, the request to an agent executing on the second server;
    getting, by the agent, the selected application configuration from a repository, the repository storing a plurality of application configurations external to the first and second servers;
    applying, by the agent, the selected application configuration to the selected application binary image in the second server; and
    wherein the agent is to validate a payload of a request by analyzing message attributes of the request prior to applying the selected application configuration, the message attributes comprising a map of key value pairs of metadata, the metadata including a timestamp, a digital signature, and a message routing identifier.

2. The computer-implemented method of claim 1, comprising:
    executing, by the second server, the selected application binary image after applying the selected application configuration.

3. The computer-implemented method of claim 1, comprising:
    identifying, by the configuration manager, a target pod hosting the second server.

4. The computer-implemented method of claim 1, wherein the repository comprises one or more application configuration templates and one or more application configurations.

5. The computer-implemented method of claim 1, wherein the request comprises a message body including a task area, a task subarea, and a name of the selected application configuration.

6. The computer-implemented method of claim 1, wherein the agent is to feed message attributes to a start method of an application configuration template for the selected application configuration to create a new application configuration and to apply the new application configuration to the selected application binary image.

7. A tangible, non-transitory computer-readable storage medium having instructions stored thereon which, when executed by a processing device, cause the processing device to:
    receive, by a configuration manager running in a first server in a multi-server computing environment, a request from a client to apply a selected application configuration to a selected application binary image previously stored on a second server in the multi-server computing environment;
    forward, by the configuration manager, the request to an agent executing on the second server;
    get, by the agent, the selected application configuration from a repository, the repository storing a plurality of application configurations external to the first and second servers;
    apply, by the agent, the selected application configuration to the selected application binary image in the second server; and
    wherein the agent is to validate a payload of a request by analyzing message attributes of the request prior to applying the selected application configuration, the message attributes comprising a map of key value pairs of metadata, the metadata including a timestamp, a digital signature, and a message routing identifier.

8. The tangible, non-transitory computer-readable storage medium of claim 7, having instructions stored thereon which, when executed by the processing device, cause the processing device to:
    execute, by the second server, the selected application binary image after applying the selected application configuration.

9. The tangible, non-transitory computer-readable storage medium of claim 7, wherein instructions to forward the request by the configuration manager comprise instructions to identify a target pod hosting the second server.

10. The tangible, non-transitory computer-readable storage medium of claim 7, wherein the repository comprises one or more application configuration templates and one or more application configurations.

11. The tangible, non-transitory computer-readable storage medium of claim 7, wherein the request comprises a message body including a task area, a task subarea, and a name of the selected application configuration.

12. The tangible, non-transitory computer-readable storage medium of claim 7, having instructions stored thereon which, when executed by a processing device, cause the processing device to feed message attributes to a start method of an application configuration template for the selected application configuration to create a new application configuration and to apply the new application configuration to the selected application binary image.

13. A system comprising:
    a plurality of servers, each server including an agent;
    a configuration manager running in server other than the plurality of servers to receive a request from a client to apply a selected application configuration to a selected application binary image previously stored on a selected server of the plurality of servers, and to forward the request to the agent executing on the selected server;
    wherein the agent is to get the selected application configuration from a repository, the repository storing a plurality of application configurations external to the plurality of servers, and apply the selected application configuration to the selected application binary image in the selected server; and
    wherein the agent is to validate a payload of a request by analyzing message attributes of the request prior to applying the selected application configuration, the message attributes comprising a map of key value pairs of metadata, the metadata including a timestamp, a digital signature, and a message routing identifier.

14. The system of claim 13, comprising:
    the selected server to execute the selected application binary image after the selected application configuration is applied.

15. The system of claim 13, wherein the configuration manager is to forward the request to the agent executing on the selected server hosted by an identified target pod.

16. The system of claim 13, wherein the repository comprises one or more application configuration templates and one or more application configurations.

17. The system of claim 13, wherein the request comprises a message body including a task area, a task subarea, and a name of the selected application configuration.

18. The system of claim 13, wherein the agent is to feed message attributes to a start method of an application configuration template for the selected application configuration to create a new application configuration and to apply the new application configuration to the selected application binary image.

\* \* \* \* \*